United States Patent
Chen

(10) Patent No.: US 10,114,599 B2
(45) Date of Patent: Oct. 30, 2018

(54) IMAGE SIMULATION METHOD AND IMAGE SIMULATION DEVICE OF CURVED DISPLAY

(71) Applicant: Shenzhen China Star Optoelectronics Technology Co., Ltd., Shenzhen, Guangdong (CN)

(72) Inventor: Lixuan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 298 days.

(21) Appl. No.: 15/115,896

(22) PCT Filed: Jul. 19, 2016

(86) PCT No.: PCT/CN2016/090404
§ 371 (c)(1),
(2) Date: Aug. 1, 2016

(87) PCT Pub. No.: WO2017/215073
PCT Pub. Date: Dec. 21, 2017

(65) Prior Publication Data
US 2018/0203657 A1   Jul. 19, 2018

(30) Foreign Application Priority Data

Jun. 15, 2016  (CN) .......................... 2016 1 04271444

(51) Int. Cl.
*G06F 3/14*   (2006.01)

(52) U.S. Cl.
CPC ...................................... *G06F 3/14* (2013.01)

(58) Field of Classification Search
CPC .......................................................... G06F 3/14
See application file for complete search history.

(56) References Cited

U.S. PATENT DOCUMENTS

| | | | |
|---|---|---|---|
| 2007/0103776 A1* | 5/2007 | Cok | G03B 21/56 359/451 |
| 2010/0295858 A1* | 11/2010 | Sugama | G06T 11/203 345/442 |
| 2017/0262961 A1* | 9/2017 | Ekambaram | G09G 5/346 |

FOREIGN PATENT DOCUMENTS

| | | |
|---|---|---|
| CN | 102288158 A | 12/2011 |
| JP | 2010148556 A | 7/2010 |

* cited by examiner

*Primary Examiner* — Amare Mengistu
*Assistant Examiner* — Jennifer Zubajlo
(74) *Attorney, Agent, or Firm* — Andrew C. Cheng

(57) ABSTRACT

The present disclosure discloses an image simulation method and an image simulation device of curved display. The image simulation method comprises: obtaining an arc length and a radius of curvature of a curved display to be simulated; converting a curved image to be displayed of the curved display into a plane simulation image on a visual plane according to the arc length and the radius of curvature. Through the image simulation method according to the present disclosure, it can simulate the displayed image of the curved display as the image on the visual plane.

7 Claims, 3 Drawing Sheets

IMAGE SIMULATION METHOD AND IMAGE SIMULATION DEVICE OF CURVED DISPLAY

BACKGROUND OF THE INVENTION

1. Field of the Invention

The present disclosure relates to the fields of curved panel display, and in particular to an image simulation method and an image simulation device of curved display.

2. The Related Arts

The current display technology is developed rapidly in 3D displays, large screen, curved screen, and etc., among these the curved screen allows people to have more realistic perception and immersion. Therefore, there are more and more businesses begin manufacturing the curved screen. For various curved screens, how to distinguish their advantages and disadvantages and how to evaluate the performance have become an important research direction.

SUMMARY OF THE INVENTION

The present disclosure provides an image simulation method and an image simulation device of curved display, which can simulate the displayed image of the curved display as the image on the visual plane.

To achieve the above object, the present disclosure provides an image simulation method of curved display, comprising: obtaining an arc length and a radius of curvature of a curved display to be simulated; converting a curved image to be displayed of the curved display into a plane simulation image on a visual plane according to the arc length and the radius of curvature, the visual plane being a tangent face tangent to a top arc position of the curved display or parallel to the tangent face; displaying the plane simulation image using a flat panel display.

Wherein, the step of converting a curved image to be displayed of the curved display into a plane simulation image on a visual plane according to the arc length and the radius of curvature comprises: dividing the arc length into multiple arc segments; respectively projecting the curved image on each arc segment onto the visual plane.

Wherein, the step of respectively projecting the curved image on each arc segment onto the visual plane satisfies the following formula:

$$A_i A_{i+1} = 2R\cos\left(\frac{\theta}{2} - \frac{2i+1}{2n}\theta\right)\sin\frac{\theta}{2n};$$

wherein, $A_i A_{i+1}$ represents a projection width of the curved image, which is on the (i+1)-th arc segment from the edge of the curved display within the n arc segments divided from the arc length, on the visual plane, $\theta=L/R$, R represents the radius of curvature, L represents the arc length, n represents positive integer greater than 2, i represents positive integer and $0 \le i < n$.

To achieve the above object, the present disclosure further provides an image simulation method of curved display, comprising: obtaining an arc length and a radius of curvature of a curved display to be simulated; converting a curved image to be displayed of the curved display into a plane simulation image on a visual plane according to the arc length and the radius of curvature.

Wherein, the image simulation method further comprises: displaying the plane simulation image using a flat panel display.

Wherein, the visual plane is a tangent face tangent to a top arc position of the curved display or parallel to the tangent face.

Wherein, the step of converting a curved image to be displayed of the curved display into a plane simulation image on a visual plane according to the arc length and the radius of curvature comprises: dividing the arc length into multiple arc segments; respectively projecting the curved image on each arc segment onto the visual plane.

Wherein, the step of respectively projecting the curved image on each arc segment onto the visual plane satisfies the following formula:

$$A_i A_{i+1} = 2R\cos\left(\frac{\theta}{2} - \frac{2i+1}{2n}\theta\right)\sin\frac{\theta}{2n};$$

wherein, $A_i A_{i+1}$ represents a projection width of the curved image, which is on the (i+1)-th arc segment from the edge of the curved display within the n arc segments divided from the arc length, on the visual plane, $\theta=L/R$, R represents the radius of curvature, L represents the arc length, n represents positive integer greater than 2, i represents positive integer and $0 \le i < n$.

To achieve the above object, the present disclosure further provides an image simulation device of curved display, comprises: an input device, which is used to input an arc length and a radius of curvature of a curved display to be simulated; an image processing device, which is used to convert a curved image to be displayed of the curved display into a plane simulation image on a visual plane according to the arc length and the radius of curvature.

Wherein, the image simulation device further comprises a flat panel display, the flat panel display is used to display the plane simulation image.

Wherein, the visual plane is a tangent face tangent to a top arc position of the curved display or parallel to the tangent face.

Wherein, the image processing device divides the arc length into multiple arc segments and then respectively projects the curved image on each arc segment onto the visual plane.

Wherein, the image processing device respectively projects the curved image on each arc segment onto the visual plane through the following mathematical model:

$$A_i A_{i+1} = 2R\cos\left(\frac{\theta}{2} - \frac{2i+1}{2n}\theta\right)\sin\frac{\theta}{2n};$$

wherein, $A_i A_{i+1}$ represents a projection width of the curved image, which is on the (i+1)-th arc segment from the edge of the curved display within the n arc segments divided from the arc length, on the visual plane, $\theta=L/R$, R represents the radius of curvature, L represents the arc length, n represents positive integer and $0 \le i < n$.

The image simulation method according to the present disclosure comprises: obtaining an arc length and a radius of curvature of a curved display to be simulated; and converting a curved image to be displayed of the curved display into a plane simulation image on a visual plane according to the arc length and the radius of curvature. The present disclosure converts the curved image into the simulation image of the visual plane using the arc length and the radius of curvature. The simulation image of the visual plane is the image that human eyes can see. Evaluating the simulation image that human eyes see can obtain the performance of the corresponding curved display.

DETAILED DESCRIPTION OF THE PREFERRED EMBODIMENTS

To enable those skilled in the art to better understand the technical aspect of the present disclosure, the detailed descriptions accompanying drawings and the preferred embodiment of an image simulation method and an image simulation device of curved display according to the present invention are as follows.

Figure 1:
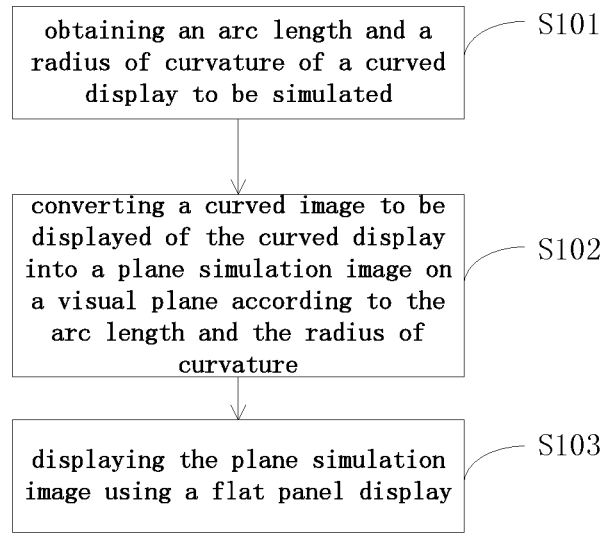
FIG. 1 is a flow diagram of the image simulation method of the curved display according to an embodiment of the present disclosure.
Figure 2:
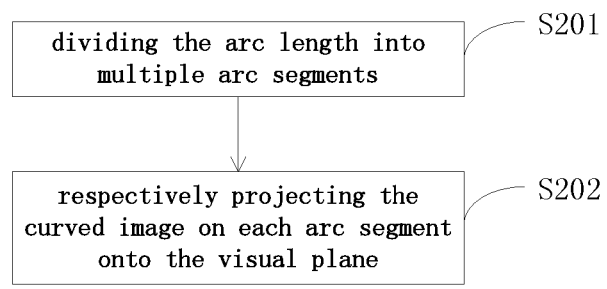
FIG. 2 is a flow diagram of converting the curved image into a plane simulation image in the image simulation method according to the embodiment shown in FIG. 1.
Figure 3:
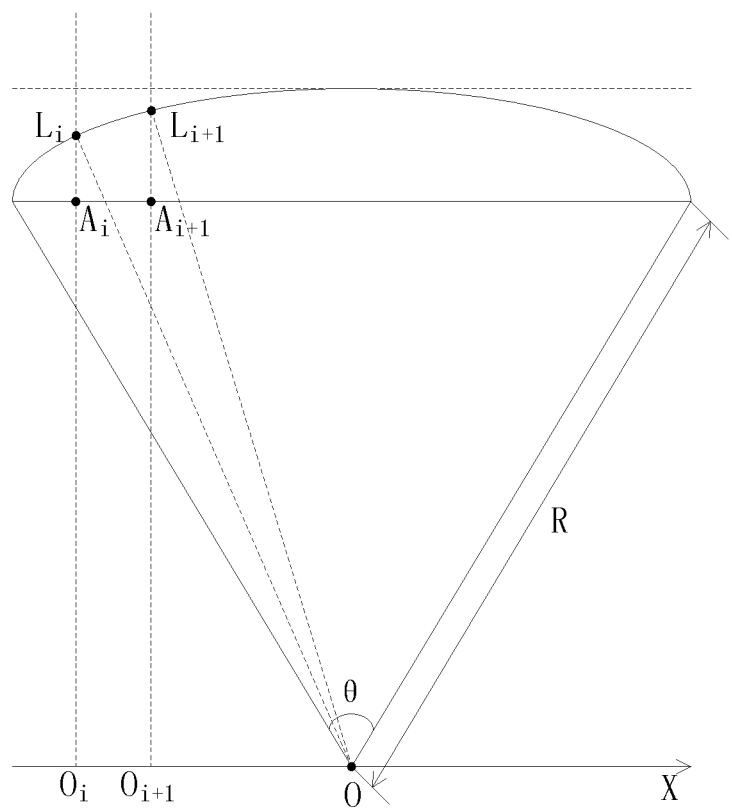
FIG. 3 is a mathematical diagram of converting the curved image into a plane simulation image in the image simulation method according to the embodiment shown in FIG. 1.

Referring to FIGS. 1, 2, and 3, FIG. 1 is a flow diagram of the image simulation method of the curved display according to an embodiment of the present disclosure, FIG. 2 is a flow diagram of converting the curved image into a plane simulation image in the image simulation method according to the embodiment shown in FIG. 1, and FIG. 3 is a mathematical diagram of converting the curved image into a plane simulation image in the image simulation method according to the embodiment shown in FIG. 1.

The image simulation method according to present embodiment comprises the following steps:

S101: obtaining an arc length and a radius of curvature of a curved display to be simulated.

The obtained arc length of the curved display to be simulated is L, and the radius of curvature thereof is R. When the observer is closer to the curved display, the focus thereof is on the curved surface itself; when the observer is far away the curved display, the focus thereof is on the projection of the curved surface onto the plane, at this time, the observer has a different sense of immersion because of different radius of curvature and arc length.

S102: converting a curved image to be displayed of the curved display into a plane simulation image on a visual plane according to the arc length and the radius of curvature.

In this step, the curved image is converted into the plane simulation image, wherein the visual plane is a tangent face tangent to a top arc position of the curved display or parallel to the tangent face. Whether the visual plane is the tangent face or parallel to the tangent face, it depends on human eyes itself, which has no influence on the conversion of the curved image.

Specifically, the step S102 comprises the following two steps:

S201: dividing the arc length into multiple arc segments.

In the present embodiment, the arc length L is divided into n arc segments, the central angle $\theta$ corresponding to the arc length L is $\theta = L/R$, the central angle corresponding to the arc segment is $\theta/n$.

S202: respectively projecting the curved image on each arc segment onto the visual plane.

The step satisfies the following formula:

$$A_i A_{i+1} = 2R\cos\left(\frac{\theta}{2} - \frac{2i+1}{2n}\theta\right)\sin\frac{\theta}{2n}$$

Wherein, $A_i A_{i+1}$ represents a projection width of the curved image, which is on the (i+1)-th arc segment from the edge of the curved display within the n arc segments divided from the arc length, on the visual plane, $\theta = L/R$, R represents the radius of curvature, L represents the arc length, n represents positive integer greater than 2, i represents positive integer and $0 \leq i < n$.

Combining with FIG. 3, the step is to project the arc segment $L_i L_{i+i}$ onto the visual plane to obtain $A_i A_{i+1}$. The specific mathematical derivation process of above formula is as follows:

$$\angle L_{i+1} O O_{i+1} = \frac{\pi}{2} - \frac{\theta}{2} + \frac{(i+1)\theta}{n}, \quad OO_{i+1} = R\cos\left(\frac{\pi}{2} - \frac{\theta}{2} + \frac{(i+1)\theta}{n}\right)$$

$$\angle L_i O O_i = \frac{\pi}{2} - \frac{\theta}{2} + \frac{i\theta}{n}, \quad OO_i = R\cos\left(\frac{\pi}{2} - \frac{\theta}{2} + \frac{i\theta}{n}\right)$$

Thus, it can be drawn that $$A_i + A_{i+1} = O_i O_{i+1} = R\left(\cos\left(\frac{\pi}{2} - \frac{\theta}{2} + \frac{i\theta}{n}\right) - \cos\left(\frac{\pi}{2} - \frac{\theta}{2} + \frac{(i+1)\theta}{n}\right)\right)$$

And then derive from the formula to obtain $$A_i A_{i+1} = 2R\cos\left(\frac{\theta}{2} - \frac{2i+1}{2n}\theta\right)\sin\frac{\theta}{2n}$$

Figure 4:
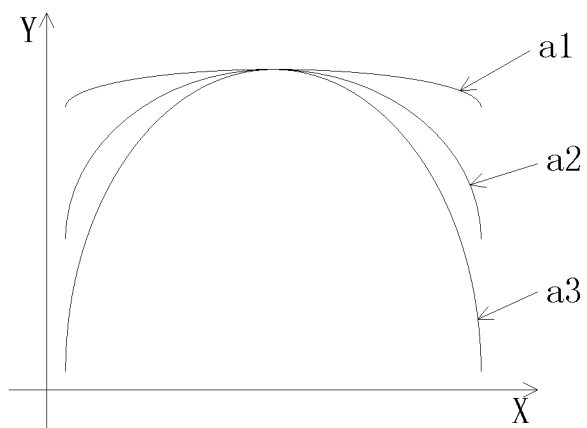
FIG. 4 is a schematic diagram of the projection width of all arc segments projected onto the visual plane in the image simulation method according to the embodiment shown in FIG. 1.

The step respectively projects the curved image on each arc segment onto the visual plane. The plane simulation image formed on the visual plane will have horizontal X direction deformation corresponding to the curved image. For $A_i A_{i+1}$, the horizontal X direction deformation is shown in FIG. 4. FIG. 4 is a schematic diagram of the projection width of all arc segments projected onto the visual plane in the image simulation method according to the embodiment shown in FIG. 1.

a1, a2, and a3 in FIG. 4 are respectively different $A_i A_{i+1}$ in the curved display. Wherein, X represents the X direction shown in FIG. 3, Y represents the size of $A_i A_{i+1}$. From FIG. 4, it can be known that the $A_i A_{i+1}$ at the edge of the curved display is the minimum, and will be the maximum at the top arc position of the curved display.

Because the angel between the intercepted arc segment at the edge of the curved display and the visual plane is the maximum, the angle is an acute angle, the projection width $A_iA_{i+1}$ of the arc segment projected onto the visual plane is the minimum. The intercepted arc segment at the top arc position of the curved display is approximately parallel to the visual plane, thus the projection width $A_iA_{i+1}$ of the arc segment projected onto the visual plane is the maximum.

Moreover, the greater the curvature is, the more intense change of $A_iA_{i+1}$ is. The curve a1 in FIG. 4 corresponds to the curved display with smaller curvature, and a3 corresponds to the curved display with greater curvature.

In summary, the closer to the edge of the curved display, the horizontal compression of the plane simulation image of the curved image projected onto the visual plane is more intense.

S103: displaying the plane simulation image using a flat panel display.

After obtaining the plane simulation image of the curved image, it displays the plane simulation image using the display device, that is, show the visual effect of the curved display. Analyzing and evaluating the plane simulation image can evaluate the corresponding curved display.

In the present embodiment, it converts the curved image to be displayed of the curved display into the plane simulation image on the visual plane according to the arc length and the radius of curvature, the plane simulation image on the visual plane is the image that human eyes see, that is the simulation of the plane image that human eyes see. Using the plane simulation image to analyze and evaluate can evaluate the corresponding curved display.

Figure 5:
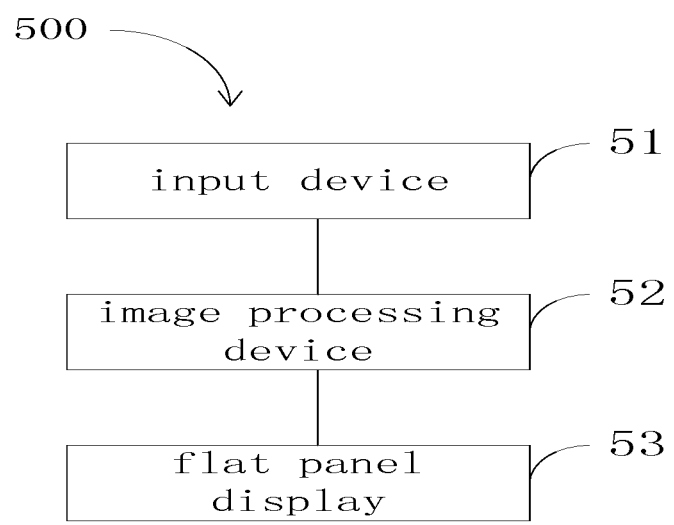
FIG. 5 is a schematic view illustrating the structure of the image simulation device of the curved display according to an embodiment of the present disclosure.

Referring to FIG. 5, FIG. 5 is a schematic view illustrating the structure of the image simulation device of the curved display according to an embodiment of the present disclosure. The image simulation device 500 according to the present embodiment comprises an input device 51, an image processing device 52, and a flat panel display 53.

The input device 51 is used to input an arc length and a radius of curvature of a curved display to be simulated.

The image processing device 52 is used to convert a curved image to be displayed of the curved display into a plane simulation image on a visual plane according to the arc length and the radius of curvature. Wherein, the visual plane is a tangent face tangent to a top arc position of the curved display or parallel to the tangent face.

Specifically, the image processing device 52 divides the arc length into multiple arc segments and then respectively projects the curved image on each arc segment onto the visual plane. It respectively projects the curved image on each arc segment onto the visual plane through the following mathematical model:

$$A_iA_{i+1} = 2R\cos\left(\frac{\theta}{2} - \frac{2i+1}{2n}\theta\right)\sin\frac{\theta}{2n}$$

wherein, $A_iA_{i+1}$ represents a projection width of the curved image, which is on the (i+1)-th arc segment from the edge of the curved display within the n arc segments divided from the arc length, on the visual plane, $\theta=L/R$, R represents the radius of curvature, L represents the arc length, n represents positive integer greater than 2, i represents positive integer and $0 \leq i < n$.

After the image processing device 52 obtains the plane simulation image, it displays the plane simulation image through the flat panel display 53.

The working process of the image simulation device 500 is the same as the above image simulation method, which is not repeated specifically. Furthermore, after simulating the curved image to obtain the plane simulation image, the image simulation device 500 can further analyze the plane simulation image to evaluate the corresponding curved display.

Input the arc length and the radius of curvature into the image simulation device 500 according to the present embodiment, and then obtain the plane simulation image of the curved image through the image processing device 52 in the image simulation device 500. The plane simulation image on the visual plane is the image that human eyes see, and then it displays the plane simulation image. The simulation device 500 according to the present embodiment can simulate the curved display and further analyze the plane simulation image to evaluate the corresponding curved display.

Embodiments of the present disclosure have been described, but not intending to impose any unduly constraint to the appended claims. Any modification of equivalent structure or equivalent process made according to the disclosure and drawings of the present disclosure, or any application thereof, directly or indirectly, to other related fields of technique, is considered encompassed in the scope of protection defined by the claims of the present disclosure.

What is claimed is:

1. An image simulation method of curved display, comprising: obtaining an arc length and a radius of curvature of a curved display to be simulated; converting a curved image to be displayed of the curved display into a plane simulation image on a visual plane according to the arc length and the radius of curvature, the visual plane being a tangent face tangent to a top arc position of the curved display or parallel to the tangent face; displaying the plane simulation image using a flat panel display;
   wherein the step of converting a curved image to be displayed of the curved display into a plane simulation image on a visual plane according to the arc length and the radius of curvature comprises: dividing the arc length into multiple arc segments;
   respectively projecting the curved image on each arc segment onto the visual plane;
   wherein the step of respectively projecting the curved image on each arc segment onto the visual plane satisfies the following formula:

$$A_iA_{i+1} = 2R\cos\left(\frac{\theta}{2} - \frac{2i+1}{2n}\theta\right)\sin\frac{\theta}{2n};$$

wherein, $A_iA_{i+1}$ represents a projection width of the curved image, which is on the (i+1)-th arc segment from the edge of the curved display within the n arc segments divided from the arc length, on the visual plane, $\theta=L/R$, R represents the radius of curvature, L represents the arc length, n represents positive integer greater than 2, i represents positive integer and $0 \leq i < n$.

2. An image simulation method of curved display, comprising: obtaining an arc length and a radius of curvature of a curved display to be simulated; converting a curved image to be displayed of the curved display into a plane simulation image on a visual plane according to the arc length and the radius of curvature;
   wherein the step of converting a curved image to be displayed of the curved display into a plane simulation image on a visual plane according to the arc length and the radius of curvature comprises: dividing the arc length into multiple arc segments;

respectively projecting the curved image on each arc segment onto the visual plane;

wherein the step of respectively projecting the curved image on each arc segment onto the visual plane satisfies the following formula:

$$A_i A_{i+1} = 2R\cos\left(\frac{\theta}{2} - \frac{2i+1}{2n}\theta\right)\sin\frac{\theta}{2n};$$

wherein, $A_i A_{i+1}$ represents a projection width of the curved image, which is on the (i+1)-th arc segment from the edge of the curved display within the n arc segments divided from the arc length, on the visual plane, $\theta$=L/R, R represents the radius of curvature, L represents the arc length, n represents positive integer greater than 2, i represents positive integer and $0 \leq i < n$.

3. The image simulation method as claimed in claim 2, wherein the image simulation method further comprises: displaying the plane simulation image using a flat panel display.

4. The image simulation method as claimed in claim 2, wherein the visual plane is a tangent face tangent to a top arc position of the curved display or parallel to the tangent face.

5. An image simulation device of curved display, comprises:

an input device, which is used to input an arc length and a radius of curvature of a curved display to be simulated;

an image processing device, which is used to convert a curved image to be displayed of the curved display into a plane simulation image on a visual plane according to the arc length and the radius of curvature;

wherein the image processing device divides the arc length into multiple arc segments and then respectively projects the curved image on each arc segment onto the visual plane;

wherein the image processing device respectively projects the curved image on each arc segment onto the visual plane through the following mathematical model:

$$A_i A_{i+1} = 2R\cos\left(\frac{\theta}{2} - \frac{2i+1}{2n}\theta\right)\sin\frac{\theta}{2n};$$

wherein, $A_i A_{i+1}$ represents a projection width of the curved image, which is on the (i+1)-th arc segment from the edge of the curved display within the n arc segments divided from the arc length, on the visual plane, $\theta$=L/R, R represents the radius of curvature, L represents the arc length, n represents positive integer greater than 2, i represents positive integer and $0 \leq i < n$.

6. The image simulation device as claimed in claim 5, wherein the image simulation device further comprises a flat panel display, the flat panel display is used to display the plane simulation image.

7. The image simulation device as claimed in claim 5, wherein the visual plane is a tangent face tangent to a top arc position of the curved display or parallel to the tangent face.

* * * * *